Patented May 29, 1951

2,555,274

UNITED STATES PATENT OFFICE 2,555,274

POLYVINYL ACETATE MOLDING COMPOSITION

George F. Metz, Diamond Point, N. Y., assignor to Shawinigan Products Corporation, New York, N. Y., a corporation of New York No Drawing. Application October 16, 1946, Serial No. 703,485

11 Claims. (Cl. 260—27)

The present invention relates to an improved molding composition suitable particularly for the manufacture of phonograph records, but useful also for making other pressed or molded articles.

More specifically the present invention relates to the manufacture of filled molding compositions, characterized by strength and resistance to warp at room temperatures, and also at a temperature of about 40° C., wherein the binder includes a polyvinyl acetate resin of relatively high molecular weight, a form-stabilizing resin, and a sharp melting resin.

It is a general object of the invention to provide a cheap molding composition characterized by good molding properties and by form stability at temperatures up to about 40° C. (104° F.) when pressed into phonograph discs, and possessing adequate strength, high resistance to needle wear, and good sound reproducing qualities.

It is a further object of the invention to provide a molding composition of the type indicated in which a mixture of polyvinyl acetate resin and a form-stabilizing resin which themselves are unsuitable for use as binders are converted into a molding material having the properties above indicated by combining the same with a sharp-melting resin.

It is a still further object of the invention to provide a molding composition especially suited for the manufacture of phonograph records and having a molding time cycle such that no material variation from common record molding practice will be required in the use of my improved molding composition.

It is known that polyvinyl acetate resins, despite their toughness, are deficient in form stability; that is, they suffer from cold flow and have a tendency to warp at about 40° C. or so when in the form of thin discs. It is also known that certain synthetic resins, such as phenol-formaldehyde resins of the varnish, generally non-hardening type, for example that known under the trade name XR 254, manufactured by Bakelite Corporation, will contribute form-stability to polyvinyl ester resins, and that a similar form-stabilizing action is exerted by certain natural gums of vegetable origin which may be defined as exudations from plants of the species Xanthorrhoea (hastilis, Australis, etc.) belonging to the order Asphodeleae, and generally known in commerce under various names such as acaroid gum or yacca gum, and sometimes as Black Boy gum or Botany Bay gum or earth shellac (United States patent to Irany No. 2,016,202), and compositions for use in manufacturing molded articles have been suggested wherein these form-stabilizing resins and gums are used with polyvinyl acetate resins. However, although these mixtures served as satisfactory binders for molding compositions for manufacturing many kinds of articles, they were not found to be suitable for compounding molding compositions for the manufacture of phonograph records. This was so because phonograph discs present the peculiar requirements that the surface must be sufficiently hard to resist needle wear and be resistant to shock in addition to having form-stability, and at the same time there must be a minimum of surface noises when the disc is being played. With these qualities must be combined the property of good moldability, as a phonograph record disc must be capable of being molded from a "biscuit" at temperatures and pressures and within a molding time cycle common in the industry; and although the molding material must be rigid and strong at room temperatures, it must possess satisfactory fluidity at the molding temperatures in order to give faithful reproductions.

The compositions prepared with the aid of a binder composed of a polyvinyl acetate resin and a form-stabilizing thermoplastic phenolic resin or natural resin, like yacca, were unsatisfactory for the manufacture of phonograph records even when the polyvinyl acetate was of low molecular weight (having a viscosity of, say, about 20 centipoises), despite the fact that such lower weight molecular resin would be expected to yield a more workable molding composition than the tougher, more refractory higher molecular weight polyvinyl acetate resins.

I have found that despite the fact that polyvinyl acetate resins even of relatively low molecular weight, either alone or in combination with a form-stabilizing agent, are unsuitable for phonograph record manufacture, nevertheless a highly satisfactory phonograph record molding composition which is superior to the known shellac compositions, from the standpoint of strength and performance, can be produced by combining polyvinyl acetate resins of relatively high molecular weight (viscosity of 45 centipoises and above) with a form-stabilizing agent and with one or more of the considerably cheaper thermoplastic resins of more or less brittle, sharp melting character, and preferably having a melting point range of about 195 to 240° F. (ring and ball method, A. S. T. M. E28–42T). Among these known sharp melting resins may be mentioned the petroleum hydrocarbon-insoluble, aromatic hydrocarbon-soluble resinous pine wood extracts containing oxidized abietic acids, such as that extracted from long-leaf yellow pine trees and available on the market under the trade mark "Vinsol," and likewise a mixture of coal tar and gashouse pitch having a softening point of about 205°–220° F., such as that sold under the name "Carbonex." Another suitable resin of this type is hard wood pitch, like that sold under the name "Demi Gum," and like the others is compatible with the polyvinyl acetate resin and the form-stabilizing agent. Preferably mixtures of these sharp melting resins are employed. Good molding compositions for phonograph record manufacture can be prepared in accordance with the invention in which the binder includes a polyvinyl acetate and yacca gum together with a quantity of sharp melting resin, like Vinsol, or Vinsol plus Carbonex, sufficient to give the complete molding material adequate fluiditiy at the usual molding temperatures. The sharp melting resins thus act in the nature of a flux for the tough and horny polyvinyl acetate resin. The polyvinyl acetates, such as those sold under the name "Gelva," have a wide range of viscosities, which are determined by the size of the macromolecules of the polymer, the size being dependent upon the degree and intensity of polymerization. It is customary in the plastics industry to refer to the different polyvinyl acetates by their viscosity numbers. The viscosity may be as low as 1.5 centipoises or lower, and as high as 500 or higher. These numbers (sometimes written with the letter V in front of them) represent the viscosity in centipoises of a benzene solution containing 86 grams of the polyvinyl acetate per liter, the viscosity being measured at 20° C. The higher the Gelva or polyvinyl acetate number, the higher will be the viscosity and the softening points rise with the viscosity.

The moldability of the Gelvas decreases with rise of the viscosity, and at the higher viscosities, the material becomes extremely difficult to mold because of its hard and horny character. As a result, prior attempts to make molding compositions with polyvinyl acetates, especially for the manufacture of phonograph records, employed the lower viscosity polymers with a form-stabilizing agent. However, to my knowledge, these prior attempts to utilize Gelva for the manufacture of phonograph records, were unsuccessful.

In accordance with the present invention I provide a molding composition characterized by satisfactory flow properties and other desirable molding characteristics at the common phonograph record molding temperatures, by form stability and freedom from warping and by a high degree of strength, by compounding a tough polyvinyl acetate resin of a viscosity of about 45 centipoises and above, a form stabilizer, preferably yacca, and a sharp-melting resin of softening point as defined above, such as a mixture of Vinsol and Carbonex, together with suitable fillers, parting agents, and, if desired, pigments and plasticizers. The proportions of the different ingredients of the binder can be readily adjusted to give a molding composition which can be pressed into phonograph records at approximately the phonograph record press cycle employed for shellac.

Although yacca and the sharp-melting resins above-referred to are brittle in nature, any embrittling effect is suppressed by the toughness and strength of the relatively high molecular weight Gelva, and phonograph records prepared from the molding composition of the present invention show a high degree of strength and resistance to shock. Apparently the Gelva, form-stabilizing resin, and sharp-melting resin form a solid complex resinous solution and such solution has properties different from those of the individual components, the resulting composition possessing adequate strength, contributed by the Gelva, but being free from the warping tendencies of such material, while being characterized at the same time by improved fluidity at the molding temperature, imparted to it by the form-stabilizing agent and the sharp-melting fluxing resin, but being free from the brittleness of these materials. In short, by combining the Gelva on the one hand with, for example, the yacca, Vinsol and Carbonex on the other, the advantageous features of both groups of resins are to a large extent preserved while their disadvantageous characteristics are to a surprising degree suppressed.

The Gelvas preferably employed by me have, as already indicated, a viscosity number of about 45 and up, the preferred viscosity range being 60–100 centipoises. In my improved composition the amount of sharp-melting resin (Vinsol, Carbonex, Demi Gum, or equivalent material), is of the order of that of the Gelva. Enough yacca or the like should be used to impart sufficient form-stability to the mixture. The composition may also contain, and for phonograph records preferably does contain, minor proportions of various waxes like carnauba and ceranova, and likewise of parting agents like stearic acid or various metal stearates, such as the lead and calcium compounds. I have found that the metal stearates, in addition to acting as lubricants, also improve the strength of the molded article, and facilitate the trimming or cutting of the flash of such article. A plasticizer, including materials like hydrogenated rosin which has also fluxing and filler-wetting properties, of which the product known as "Staybelite" is an example and materials which, while not commonly regarded as plasticizers act as such in my composition, like beta-chloronaphthalene, sold under the name "Halowax," may be added to improve the molding properties of the composition. The filler may be selected from a large group of substances, including calcium carbonate, such as that sold under the name "Lesomite," slate, clay, such as fine red clay (99.9% through 325 mesh) and sold under the name "Filler 1019," diatomaceous earth, like that sold under the names "Superfloss," "Diccalite" and "Celite," and other known fillers or mixtures thereof.

The following formulas are presented to illustrate satisfactory compositions in accordance with the invention:

Example 1

| | Parts by weight |
|---|---|
| Gelva 60 | 240 |
| Yacca | 160 |
| Vinsol | 200 |
| Carnauba wax | 4 |
| Ceranova wax | 4 |
| Stearic acid | 4 |
| Zinc stearate | 4 |
| Lead stearate | 4 |
| Carbon black | 12 |
| Lesomite | 680 |

The mixtures are compounded by fine grinding and intimately mixing on differential speed rolls at a temperature of about 200–260° F. for about 10 minutes, or in a jacketed Banbury mixer or equivalent apparatus, and then sheeted on even speed rolls. The filler should be of fine particle size to reduce needle scratch where the composition is to be employed for the manufacture of phonograph records. A similar mode of compounding the materials can be used in working up the following compositions.

Example 2

| | Parts by weight |
|---|---|
| Gelva 60 | 240 |
| Yacca | 160 |
| Vinsol | 200 |
| Carbonex | 5 |
| Carnauba wax | 2½ |
| Ceranova wax | 2½ |
| Halowax | 12 |
| Lead stearate | 12 |
| Calcium stearate | 9 |
| Carbon black | 12 |
| Superfloss | 480 |

Example 3

| | Parts by weight |
|---|---|
| Gelva 100 | 240 |
| Yacca | 160 |
| Vinsol | 160 |
| Staybelite | 32 |
| Ortho nitro diphenyl | 15 |
| Ceranova wax | 5 |
| Lead stearate | 24 |
| Carbon black | 30 |
| Celite 235 | 100 |
| Clay (325 mesh or finer) | 300 |

Example 4

| | Parts by weight |
|---|---|
| Gelva 500 | 240 |
| Yacca | 160 |
| Vinsol | 100 |
| Carbonex | 100 |
| Ceranova wax | 5 |
| Lead stearate | 24 |
| Carbon black | 30 |
| Celite 235 | 100 |
| Clay (325 mesh or finer) | 300 |

Example 5

| | Parts by weight |
|---|---|
| Gelva 60 | 240 |
| Yacca | 160 |
| Vinsol | 80 |
| Carbonex | 85 |
| Ceranova wax | 5 |
| Lead stearate | 24 |
| Carbon black | 30 |
| Celite | 100 |
| Filler 1019 | 400 |

Example 6

| | Parts by weight |
|---|---|
| Gelva 60 | 240 |
| Yacca | 160 |
| Demi Gum | 160 |
| Carbonex | 40 |
| Ceranova wax | 5 |
| Lead stearate | 24 |
| Carbon black | 30 |
| Celite | 100 |
| Filler 1019 | 300 |

Biscuits prepared with the above compositions have good molding properties and yield low-cost phonograph discs characterized by high strength, form-stability, and excellent sound reproducing qualities.

Where reference is made to viscosity in the claims, it is to be understood that the viscosity is of a benzene solution at 20° C. containing 86 grams of the resin per liter.

I claim:

1. A molding composition as defined in claim 7, wherein the polyvinyl acetate has a viscosity of about 60 centipoises measured under the aforesaid conditions.

2. A molding composition as defined in claim 7, including a small proportion of a hard wax of the group consisting of carnauba and ceranova.

3. A binder suitable for use in the manufacture of filled phonograph records and comprising approximately 240 parts of polyvinyl acetate having a viscosity of about 60 centipoises when measured at 20° C. in a benzene solution containing 86 g. of the acetate per liter, 160 parts of yacca gum, and 200 parts of a petroleum hydrocarbon-insoluble, aromatic hydrocarbon-soluble resinous pine wood extract, together with minor proportions of a hard wax of the group consisting of carnauba and ceranova.

4. A phonograph record having a surface composed of a plastic composition containing a filler and a binder, the binder comprising approximately 240 parts of polyvinyl acetate having a viscosity of at least 45 centipoises when measured at 20° C. in a benzene solution containing 86 g. of the acetate per liter, 160 parts of yacca gum, and 200 parts of a petroleum hydrocrabon-insoluble, aromatic hydrocarbon-soluble, resinous pine wood extract.

5. A binder suitable for use in the manufacture of filled phonograph records and comprising polyvinyl acetate having a viscosity of at least 45 centipoises when measured at 20° C. in a benzene solution containing 86 g. of the acetate per liter, yacca gum, a petroleum hydrocarbon-insoluble, aromatic hydrocarbon-soluble, resinous extract from long-leaf yellow pine trees, and a mixture of coal tar and gashouse pitch, the proportion of said resinous extract together with said pitch being sufficient to cause said binder to be of free-flowing character when heated with a filler above its softening point, and the proportion of yacca gum being such as to impart form-stability at temperatures of about 104° F. to a filled molding composition prepared with the binder.

6. A phonograph record having a surface composed of a plastic composition containing a filler and a binder, the binder comprising polyvinyl acetate having a viscosity of at least 45 centipoises when measured at 20° C. in a benzene solution containing 86 g. of the acetate per liter, a form-stabilizing resin for the polyvinyl acetate of the group consisting of thermoplastic phenolaldehyde resins and yacca gums in quantity sufficient to impart form-stability to the composition at temperatures of about 104° F., and a sharp-melting resin of softening point within the range of about 195° to 240° F. and selected from the group consisting of petroleum hydrocarbon-insoluble, aromatic hydrocarbon-soluble, resinous pine wood extracts, mixtures of coal tar and gashouse pitches, and hard wood pitches, in a proportion operative to render the composition free-flowing at record molding temperatures and pressures.

7. A molding composition capable of producing form-stable, relatively thin articles and comprising a filler and a binder, the binder comprising polyvinyl acetate having a viscosity of at least 45 centipoises when measured at 20° C. in a benzene solution containing 86 g. of the acetate per liter, a proportion of a form-stabilizing resin for the polyvinyl acetate of the group consisting of thermoplastic phenol-aldehyde resins and yacca gums sufficient to form-stabilize the polyvinyl acetate at a temperature of about 104° F., and a sharp-melting resin of softening point within the range of about 195° to 240° F., and selected from the group consisting of petroleum hydrocarbon-insoluble, aromatic hydrocarbon-soluble resinous pine wood extracts, mixtures of coal tar and gashouse pitches, and hardwood pitches in a proportion sufficient to render the composition free-flowing at molding temperatures.

8. A molding composition comprising a filler and a binder, the binder consisting principally of a homogeneous mixture of polyvinyl acetate having a viscosity of at least 45 centipoises when measured at 20° C. in a benzene solution containing 86 g. of the acetate per liter, a proportion of yacca gum sufficient to form-stabilize the composition at a temperature of about 104° F., and a sharp-melting resin of softening point within the range of about 195° to 240° F. and selected from the group consisting of petroleum hydrocarbon-insoluble, aromatic hydrocarbon-soluble resinous pine wood extracts, mixtures of coal tar and gashouse pitches, and hardwood pitches, in an amount sufficient to render the composition free-flowing at molding temperatures.

9. A molding composition comprising a filler and a binder, the binder comprising polyvinyl acetate having a viscosity of at least 45 centipoises when measured at 20° C. in a benzene solution containing 86 g. of the acetate per liter, a proportion of a form-stabilizing resin for the polyvinyl acetate of the group consisting of thermoplastic phenol-aldehyde resins and yacca gums sufficient to form-stabilize the polyvinyl acetate at a temperature of about 104° F., and a quantity of a petroleum hydrocarbon-insoluble, aromatic hydrocarbon-soluble, resinous pine wood extract approximately equal to that of the polyvinyl acetate.

10. A form-stable molding composition comprising a filler and binder, the binder comprising polyvinyl acetate having a viscosity of at least 45 centipoises when measured at 20° C. in a benzene solution containing 86 g. of the acetate per liter, a proportion of yacca gum sufficient to form-stabilize the polyvinyl acetate at a temperature of about 104° F., and a quantity of a petroleum hydrocarbon-insoluble, aromatic hydrocarbon-soluble resinous pine wood extract approximately equal to that of the polyvinyl acetate.

11. A molding composition as defined in claim 7, wherein the sharp-melting resin is a mixture of a petroleum hydrocarbon-insoluble, aromatic hydrocarbon-soluble resinous pine wood extract and a mixture of coal tar and gashouse pitch, such mixture being present in a quantity approximately equal to that of the polyvinyl acetate.

GEORGE F. METZ.

REFERENCES CITED

The following references are of record in the file of this patent:

UNITED STATES PATENTS

| Number | Name | Date |
|---|---|---|
| 2,016,202 | Irany | Oct. 1, 1935 |
| 2,062,815 | Matheson | Dec. 1, 1936 |
| 2,114,393 | Lane | Apr. 19, 1938 |
| 2,130,239 | Hunter | Sept. 13, 1938 |
| 2,193,026 | Hall | Mar. 12, 1940 |
| 2,361,418 | Robinson | Oct. 31, 1944 |